April 28, 1936. G. ARSNEAU 2,038,626
POSITIONING AND SUPPORTING MEANS FOR PORTABLE SAWS
Original Filed Nov. 15, 1933 3 Sheets-Sheet 1
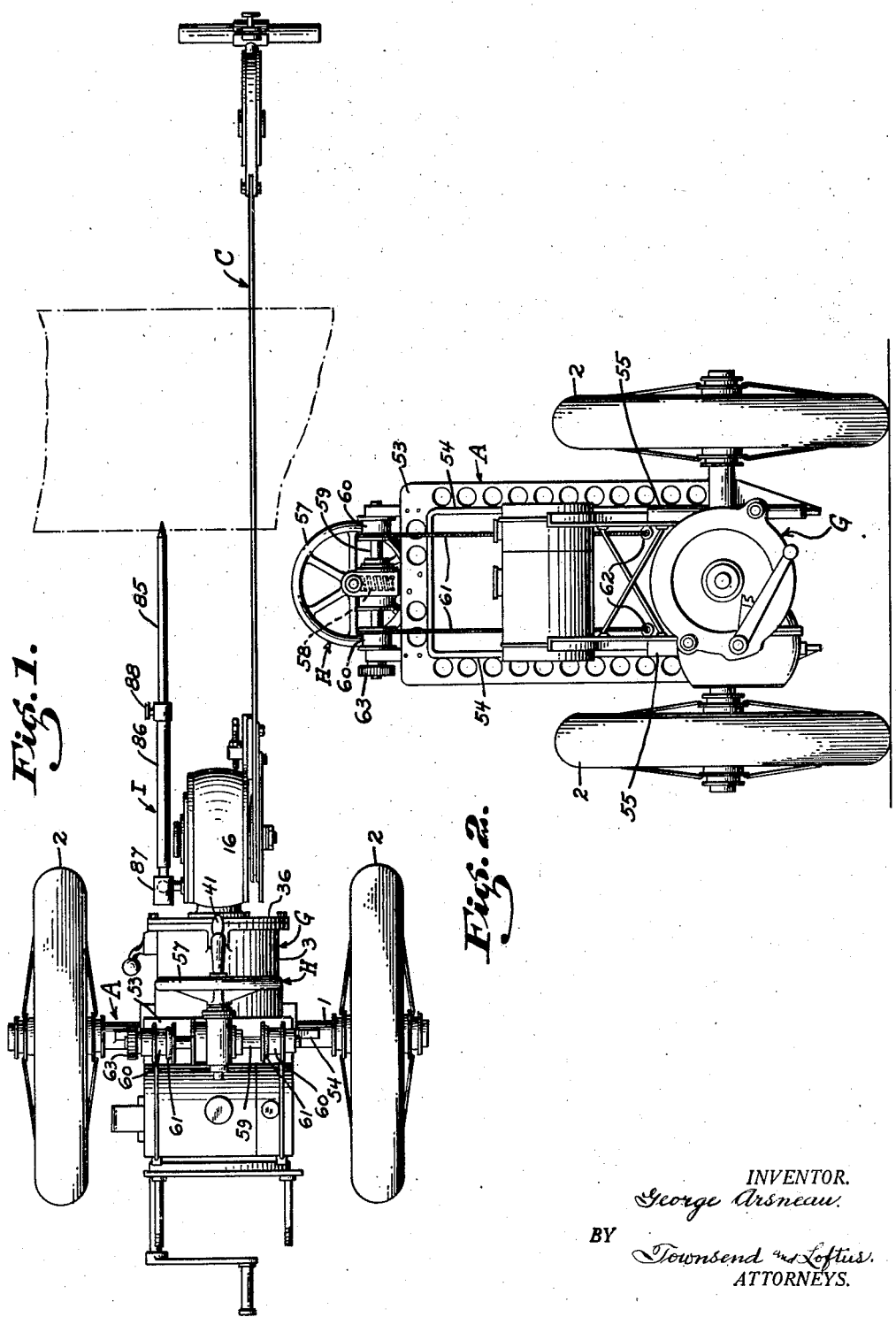
INVENTOR.
George Arsneau.
BY Townsend and Loftus.
ATTORNEYS.

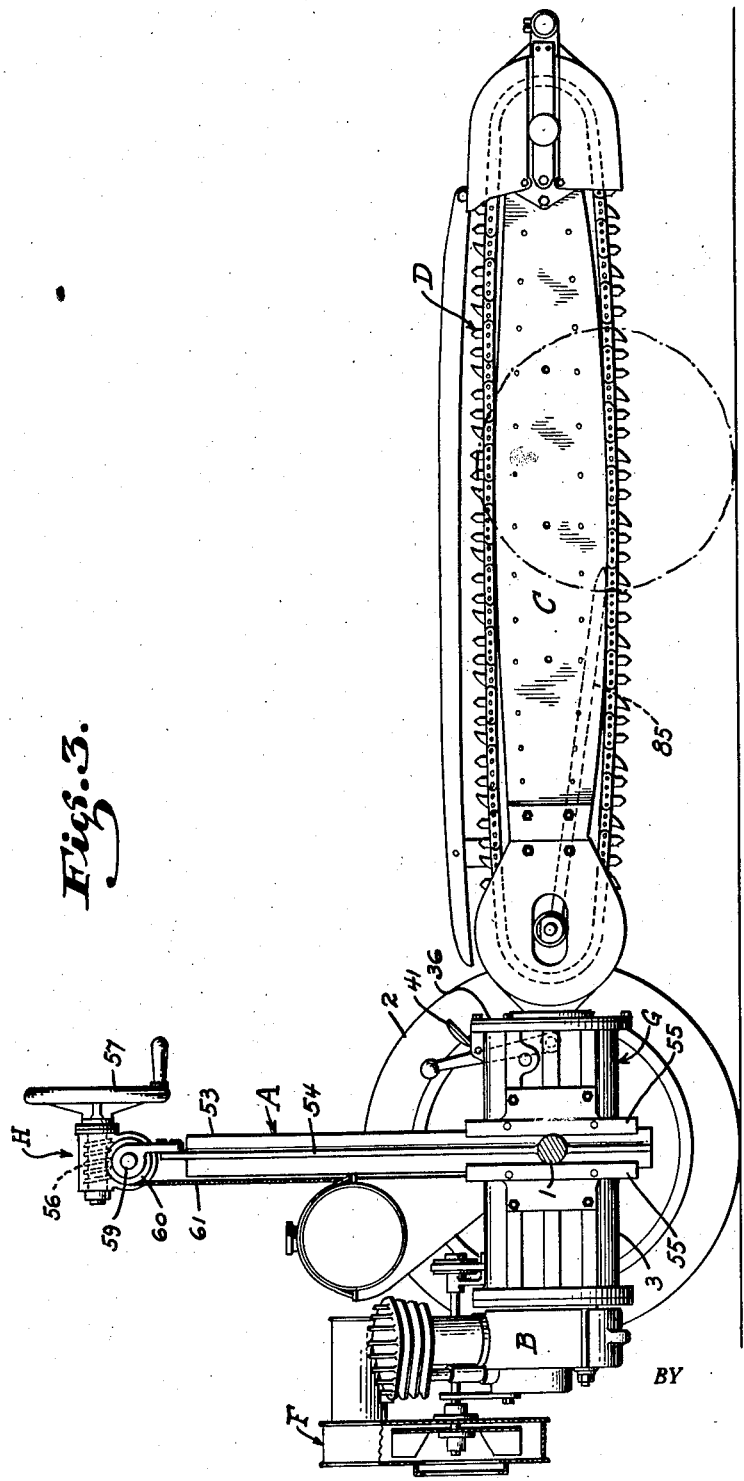

April 28, 1936.   G. ARSNEAU   2,038,626
POSITIONING AND SUPPORTING MEANS FOR PORTABLE SAWS
Original Filed Nov. 15, 1933   3 Sheets-Sheet 3
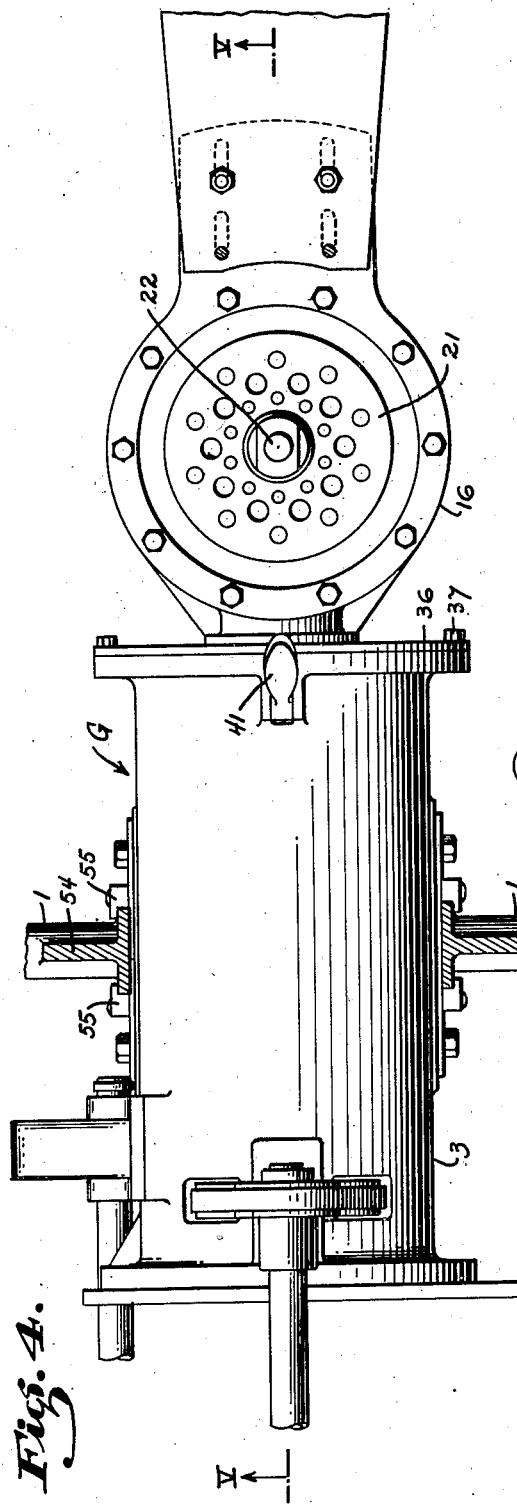
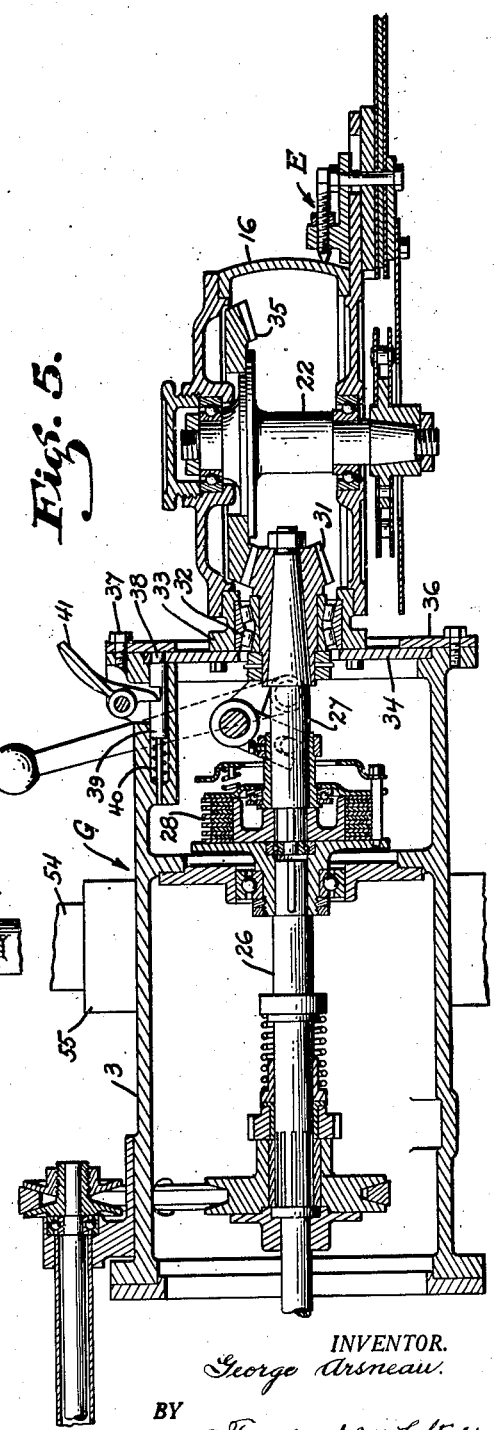
INVENTOR.
George Arsneau.
BY Townsend and Loftus.
ATTORNEYS.

Patented Apr. 28, 1936

2,038,626

UNITED STATES PATENT OFFICE 2,038,626

POSITIONING AND SUPPORTING MEANS FOR PORTABLE SAWS

George Arsneau, Los Angeles, Calif., assignor, by mesne assignments, to Dow Power Saw Company, a corporation of California Original application November 15, 1933, Serial No. 698,186. Divided and this application January 30, 1934, Serial No. 708,984

4 Claims. (Cl. 143—32)

This application is a division of my copending application entitled Power saws, filed Nov. 15, 1933, Ser. No. 698,186.

This invention relates to saws of the type described in the above-named application and pertains more particularly to means for supporting and positioning the saw.

It is the object of the present invention to provide in combination with a power operated portable saw, means for supporting the saw that will permit of turning the saw on its longitudinal axis to effect cuts at different angles, means to raise and lower the entire saw assembly while it is set to cut at any desired angle and means to maintain the saw in fixed position relative to the work being cut, all without in any way interfering with the driving connections of the saw or the efficiency of the sawing operation.

Further of the objects and advantages of the invention will become apparent upon reading the following specification.

One form which the invention may assume is exemplified in the following description and illustrated by way of example in the accompanying drawings, in which:

Fig. 1 is a plan view of one form of sawing machine embodying the invention.

Fig. 2 is a view of the same machine in end elevation.

Fig. 3 is a view in side elevation of the sawing machine with parts broken away and parts in section.

Fig. 4 is a fragmentary view in elevation on an enlarged scale with parts shown in section.

Fig. 5 is a sectional view taken on the line V—V of Fig. 4.

Referring more particularly to the drawings, I show a portable carriage or support A, a power plant B in the nature of an internal combustion engine, a saw assembly C including preferably, but, it is thought, not necessarily, a chain saw D, and in conjunction with said saw, mechanism E is employed for tensioning the saw. F is a cooling system for the power plant, and G is a transmission by means of which motion will be taken into the saw to drive same at high speed. H is a raising and lowering mechanism for the saw assembly and I is a means for maintaining a definite working relationship of the machine to its work during movement of the saw assembly in a predetermined plane.

The power plant B, saw assembly C, chain saw D, mechanism E, cooling system F and transmission G are all more specifically described in my copending application above referred to and hereafter only parts of said mechanisms will be described as are necessary to a complete understanding of the construction and operation of the saw supporting and positioning means.

The fulcrum means A preferably comprises a wheeled carriage whose horizontal axle 1 has mounted thereon supporting wheels 2—2, to allow for convenient portability of the entire equipment or organization of parts employed. However, this not only furnishes satisfactory means by which the machine may be readily transported from one place to another, but it essentially enables the saw assembly C to fulcrum both about the horizontal axis of the wheels 2—2 and about, let us say, an imaginary vertical axis which latter is located approximately midway between said wheels and in a line which intersects the said horizontal axis.

The housing 3 accommodates the drive shaft 26 of the power plant B and a driven shaft 27, the former adapted to transfer power to the latter through a clutch 28 of the multiple dry disk type. The driving bevel gear 31 turns in bearings 32 contained in a cylindrical extension 33 which forms part of a swiveled head 34 at the aforestated front end of the housing 3 and it meshes with a large bevel gear 35 fixed to a spindle 22. The head 34 is maintained in position at the front end of the housing by a retaining ring 36 removably secured to the housing by machine screws 37. I have, in this way, provided for rotary movement being set up in the head 34 and because of the fact that this head fixedly connects with the gear housing 16, the latter is adapted to move with the frame of the saw assembly, thus enabling the said frame to be angularly tilted or adjusted in order that it may occupy different angularly related planes depending upon the cut intended to be produced. The head 34 is formed with an annular series of keeper apertures 38 and selectively cooperable therewith is a reciprocal latch bolt 39 which may be retracted from an engaged aperture against the normal force of a spring 40, by means of a manipulating lever 41.

In order that the saw may be adjusted vertically and to thereby effect cuts at various elevations on the work, I provide the axle of the fulcrum means A with an inverted U-shaped hoist frame 53 having longitudinal guide rails 54 on which are movable the guide flanges 55. These guide flanges are a fixed part of a transmission housing which supports the saw unit as will be best observed on reference to Figure 3. At the upper end of the frame 53 is a worm gear 56, which carries a crank wheel 57 in order that it may be readily turned. This worm gear meshes with a gear 58 on a shaft 59 at said upper end of the frame 53, and this shaft carries reels 60—60, each operatively accommodating a hoisting cable 61 so that it may be wound up or paid out according as the wheel 57 is turned in one direction or another. The lower ends of these cables are attached at 62 to the guide flanges 55. The shaft 59 is equipped with a ratchet detent mechanism 63 which functions to positively latch the worm 56 against turning.

The work retaining means I comprises a sharp-ended thrust rod 85 which is telescopically connected with a rigid tube 86. This tube is supported from a ball and socket joint 87, whose ball element is mounted upon an adjacent side of a gear casing 16. A set screw 88 at the outer end of the tube 86 may be firmly advanced against the thrust rod to hold same in a desired position of longitudinal adjustment. It follows that this thrust rod is thus free for vertical swinging movement and for movement toward the work to be held during the time that the chain saw is in operation. In Figure 1, I show in dotted lines a log, the position of which is horizontal such as will enable the saw to make a vertical cut. Here it will be noted that the thrust rod 85 has been moved to a position where the pointed free end thereof effectively penetrates the log, thereby holding the log in a fixed cutting relationship to the carriage of the machine. From the fact that the thrust rod may tilt in a vertical direction, the same will readily be adapted to a movement of the saw frame vertically downwards as the frame is turned about its horizontal axis.

In Figure 3 the saw assembly is in a position to dispose the saw to effect a vertical cut, at which time the latching bolt 39 co-acts with its keeper aperture 38 to hold the assembly in its position of angular adjustment. The saw assembly projects laterally from one side of the support A on which it is mounted, and the power plant B is situated laterally in an opposite direction at the other side of the said support. This saw assembly is quite long as compared with the over-all distance of the power plant from the vertical center of the support. In consequence thereof, the assembly overbalances the weight of the power plant and same tends to move vertically downwardly when in a position to effect a vertical cut.

When it is desired to employ the machine to effect other than vertical cuts, the saw assembly is adjusted angularly to a predetermined or desired position, and same is locked in said position by the bolt 39 in the manner aforementioned. The entire saw assembly along with the power plant B may be now moved by the raising and lowering mechanism H so that cuts can be readily made at various elevations. In the event that the cut to be effected is in a horizontal plane, it obviously follows that the operator will manipulate the saw assembly by applying necessary or sufficient force to the extreme outer end of the saw assembly so as to properly advance the saw in a feeding direction. In doing so, the machine moves about the vertical axis of the support A. Upon reference to Figure 5 of the drawings, it will be clear to one skilled in the art that the gear housing 16 may freely turn about the gear 31 when adjusting the saw to an intended angular position when other than vertical cuts are to be made. Because of the manner of mounting the saw assembly on the support A, horizontal cuts in positions very close to the ground line may be made, and I reiterate that this can be accomplished with much better success than is possible with a cross cut saw of the common well-known variety such as requires the laborious help of two operators to control its action.

Having thus described my invention, what I claim and desire to secure by Letters Patent is:

1. In a portable saw, a wheeled base, a U-shaped frame supported between the wheels, a sawing unit slidably mounted in said U-shaped frame to slide above and below the axes of the wheels, and means for adjusting the sawing unit vertically by sliding it in said frame.

2. In a portable saw, a wheeled base, a U-shaped frame supported between the wheels and extending vertically above and below the axes thereof, and a sawing unit mounted for vertical adjustment within said frame.

3. In a portable saw, a base comprising a pair of wheels, an inverted U-shaped frame supported between the wheels and extending vertically above and below the axes thereof, a sawing unit mounted for vertical sliding movement between the vertical members of said frame, and means carried by the horizontal portion of the frame and connected with the sawing unit for effecting said adjustment.

4. In a portable saw having a wheeled base, a pair of vertical guide members extending above and below the axes of said wheels, a sawing unit mounted for movement between said guide members, and means for moving said unit.

GEORGE ARSNEAU.